United States Patent
Kantor

[15] 3,685,495
[45] Aug. 22, 1972

[54] MULTI-SUPPORTED MOVABLE TROUGH-CONTROLLED WATERER

[72] Inventor: Itzhak Kantor, Kibbutz Maagan Michael Doar Wa Menashe, Hof Hacarmel, Israel

[73] Assignee: Plasson Maagan Michael Industries, Ltd., Hof Hacarmel, Israel

[22] Filed: Feb. 16, 1971

[21] Appl. No.: 115,357

Related U.S. Application Data

[63] Continuation-in-part of Ser. No. 823,061, May 8, 1969, Pat. No. 3,590,782.

[30] Foreign Application Priority Data
July 1, 1970    Israel ....................... 34,826

[52] U.S. Cl. .................................................. 119/81
[51] Int. Cl. ................................................ A01k 7/00
[58] Field of Search ........................................ 119/81

[56] References Cited

UNITED STATES PATENTS 3,283,746  11/1966  Ruter ........................... 119/81
3,590,782  7/1971  Kantor ........................... 119/81

Primary Examiner—Aldrich F. Medbery
Attorney—Benjamin J. Barish

[57] ABSTRACT

A poultry drinking fountain, particularly for very young chicks, comprises a water trough, a hanger supporting the trough in suspension, a resilient mounting suspending the trough from the hanger, a valve controlling the flow of water to the trough in response to the amount of water therein, a weight, and a mounting for the weight attached directly to the hanger independently of the resilient mounting of the trough to the hanger. The weight projects below the bottom of the water trough so that it may rest on the ground while the water trough is supported in suspension slightly above the ground, where it is accessible for very young chick.

4 Claims, 3 Drawing Figures

PATENTED AUG 22 1972
3,685,495
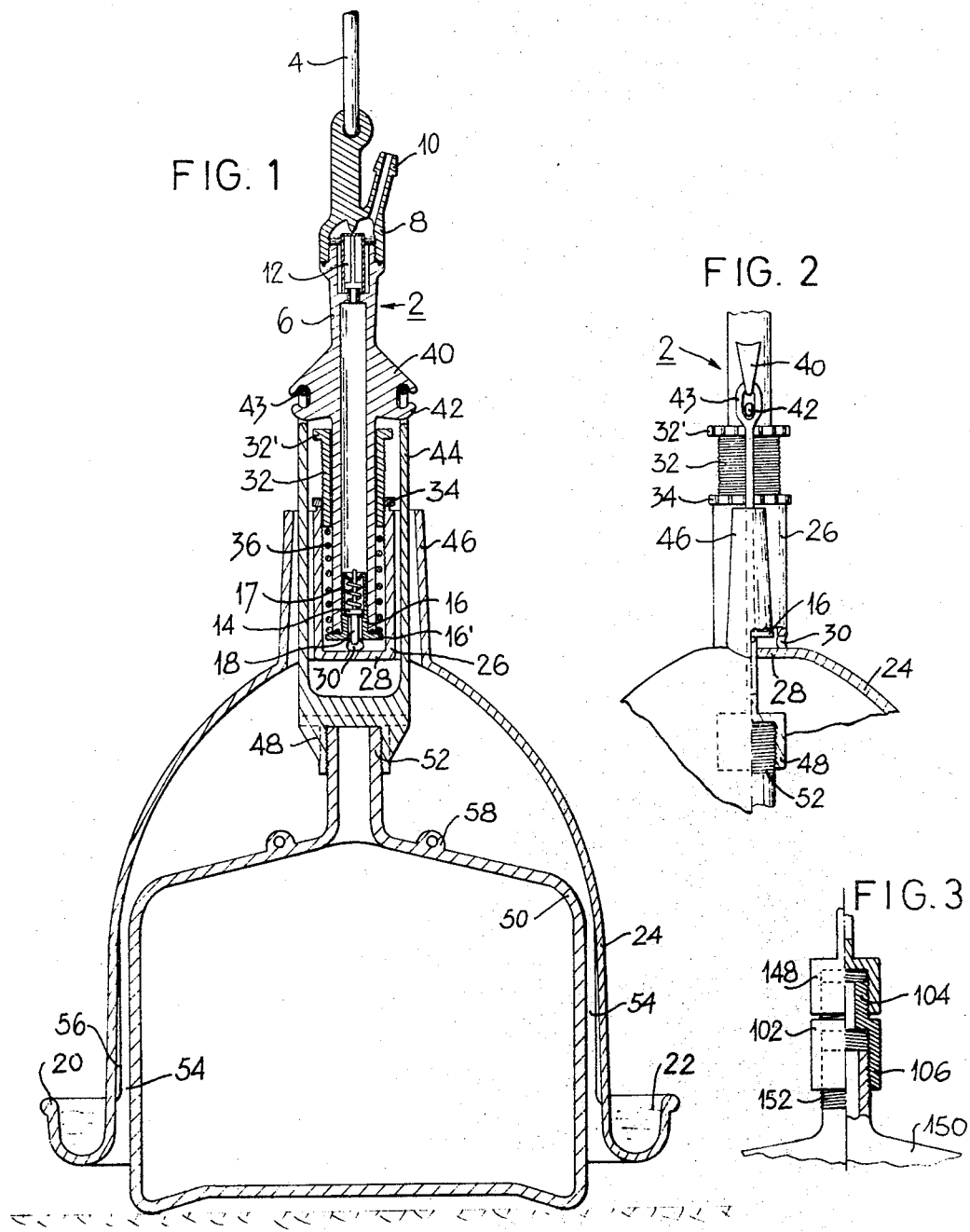
INVENTOR
ITZHAK KANTOR
BY [signature]
ATTORNEY

MULTI-SUPPORTED MOVABLE TROUGH-CONTROLLED WATERER

The present invention is a continuation-in-part of my Patent application Ser. No. 823,061, and now U.S. Pat. No. 3,590,782 filed May 8, 1969 and now U.S. Pat. No. 3,590,782.

BACKGROUND OF THE INVENTION

The invention relates to suspension-type poultry drinking fountains, and particularly to such fountains which include a resilient mounting for the water trough which controls a valve for automatically replenishing the supply of water to the trough.

A number of such poultry drinking fountains are known, but one of the serious drawbacks is the tendency of the suspended drinking trough to swing as the poultry drink therefrom.

The invention described in my Patent application Ser. No. 823,061 substantially lessens the swinging problem in this type of fountain in a very simple manner which does not affect the sensitivity of the valve operation. The poultry drinking fountain described there comprise a water trough adapted to contain the poultry drinking water, a valve controlling the flow of water to the trough, a hanger supporting the trough in suspension, and a resilient mounting suspending the trough from the hanger such that when the water in the trough drops below a predetermined quantity the trough rises and opens the valve to permit more water to flow there through to the trough. According to that invention, the fountain includes a mounting for supporting a weight, the weight mounting being attached directly to the hanger independently of the resilient mounting of the trough to the hanger. The weight thus minimizes swinging of the trough but does not affect the sensitivity of the resilient mounting of the trough for operating the valve. The weight in the described embodiment is a water receptacle.

That poultry drinking fountain has enjoyed a high degree of success in the market and has come into widespread use. However, when the fountain is used for chickens of only a few days old, the fountain must be supported very close to the ground so that the young chicks can reach and drink from the water trough. Here there is a danger the water trough may come into contact with the ground which can cause flooding since the valve is held open.

SUMMARY OF THE PRESENT INVENTION

The present invention avoids the above drawback, and is therefore especially useful in poultry drinking fountains for very young chicks.

According to the present invention the weight is arranged so that it projects below the bottom of the trough, whereby it may rest on the ground (or other horizontal support) while the water trough is supported in suspension above the ground. Thus, when the fountain is used with very small chicks, the water trough may be supported very close to the ground with the assurance that it cannot come into contact with the ground to cause flooding.

BRIEF DESCRIPTION OF THE DRAWINGS

The invention is herein described by way of example only with reference to the accompanying drawings, wherein:

FIG. 1 is a longitudinal sectional view of a suspension-type poultry drinking fountain constructed according to my Patent application Ser. No. 823,061 but incorporating the present invention.

FIG. 2 is a side elevational view, partly in section, of a portion of the drinking fountain of FIG. 1 turned 90°; and FIG. 3 is a fragmentary view, partly in section, of another embodiment of the present invention.

DESCRIPTION OF THE PREFERRED EMBODIMENT

The poultry drinking fountain illustrated in the drawings comprises a hanger generally designated 2 including a hanger strap 4 for supporting the unit in suspension, a tube 6, and a fitting 8 attached to the upper end of the tube. A water supply inlet 10 is carried at the upper end of fitting 8. The water passes through a filter 12 disposed within the upper end of tube 6, and then through the tube, exiting through a valve 14. The latter valve is enclosed within a casing 16 and is normally urged closed by a spring 17 but may be opened by an operator 18 protruding through the lower end of the casing.

The water trough 20 for the poultry drinking water 22 is annular in shape and is carried at the lower end of a bell-shaped member 24 with which it is integrally formed as a single unit, e.g., from plastic. Tube 6 and fitting 8 may also be made of plastic. The upper end of member 24 includes a narrow neck 26 open at the top and closed at the bottom by a wall 28. One or more openings 30 are formed at the bottom of neck 26 and permit the water passing through valve 14 to flow to the external surface of bell-shaped member 24 and along that surface to the water trough 20. The upper end of neck 26 is internally threaded and adjustably receives an externally threaded sleeve 32, which may be locked in position by nut 34. Sleeve 32 slidably envelope tube 6 and may be knurled at the top 32' to facilitate its adjustment with respect to neck 26. A spring 36 is interposed between the lower end of sleeve 32 and external flange 16' on valve casing 16.

The water trough 20 and the bell-shaped member 24 float from the hanger 2 by means by spring 36, the latter forming a resilient mounting such that when the water within trough 20 falls below a predetermined quantity, the trough will rise, causing wall 28 to lift valve operator 18 to open the valve and to permit more water to flow through openings 30 to the water trough. When a sufficient quantity has been added to the trough, the trough lowers by the weight of the water therein, and valve operator 18 is moved to its normally closed position by spring 17, cutting-off the further flow of water.

The fountain further includes a pair of wings 40 integral with tube 6, each wing including a hook 42 adapted to receive an eye 43 formed at the upper end of each of a pair of arms of a bail 44. The latter arms pass through a pair of covers 46 integral with bell-shaped member 24 into the interior of the member. The lower end of bail 44 carries an internally threaded element or socket 48 for receiving a weight, in this case a receptacle 50 adapted to be filled with water. The mouth 52 of the receptacle is threaded and is removably received in element 48 of the bail. The diameter of water receptacle 50 (or other weight used, e.g., a block of concrete or metal) is slightly less than that of bell-shaped member 24 so as to provide a relatively small space or clearance 54 between the two. If desired the inside surface of member 24 may be provided with ribs 56 for reducing this clearance. Also, receptacle 50 may be formed with eyes 58 for receiving a handle (not shown) to facilitate carrying the receptacle.

It will be seen that the water receptacle 50 substantially lessens the swinging tendency of the fountain in a very simple manner, and yet it does not effect the sensitivity of the resilient mounting for operating the valve 14 since it is supported independently of this mounting.

As indicated earlier, when the above-described poultry drinking fountain is used with very young chicks, the water trough has to be suspended so close to the ground in order that the chicks may reach it, that there is a danger the trough may come into contact with the ground, which could cause flooding because the valve would then be held in open condition.

The present invention eliminates this possibility, in that the weight projects below the bottom of the water trough, whereby it may rest on the ground or other horizontal support while the water trough is supported in suspension above the ground.

FIG. 1 illustrates one way of accomplishing this. Here the neck 52 of the water receptacle 50 is enlongated so that its bottom projects below the bottom of the water trough 20.

As shown, hooks 42 are formed so that their upper surfaces overlie eyes 43 of bail 44. Thus, when the fountain is used by resting the bottom of weight 50 on the ground, the weight of the fountain is supported by bail 44 (under compression, instead of tension) while the water trough is suspended above the ground.

In FIG. 3, the above-described arrangement is accomplished by providing an extension member 102 between the hanger and the weight 150. Extension member 102 is formed at one end with an externally threaded connector 104 adapted to be received in internally threaded socket 148 of the hanger, while the opposite end of extension 102 is formed with an internally threaded socket 106 adapted to receive the externally threaded mouth 152 of the water receptacle (or other weight) 150.

With the above improvement, the fountain need not be suspended from the strap 4, but rather may be supported directly on the ground with the bottom of the water receptacle or other weight resting on the ground. The water trough 20 may thus be suspended slightly above the ground so as to be easily accessible to young chicks without danger that the water trough may come into contact with the ground causing flooding.

Normally, the fountain would be supported in this manner on the ground only when the chicks are very young, and after that, it would be suspended from strap 4. Extension member 102 may be provided to existing fountains to adapt them for this use. In addition, it may be provided in different sizes, or in the form of an adjustable member (e.g., two parts in threaded telescoping arrangement), so as to permit a gradual increase in the height of the water trough before suspending it from strap 4.

What is claimed is:
1. A poultry drinking fountain, comprising, a water trough, a hanger supporting said trough in suspension, a resilient mounting suspending said trough from said hanger, a valve controlling the flow of water to the trough in response to the amount of water therein, a weight, and a mounting for said weight attached directly to said hanger independently of said resilient mounting of the trough to the hanger, characterized in that said weight projects below bottom of the water trough so that it may rest on the ground while the water trough is supported in suspension above the ground.

2. A fountain according to claim 1, wherein said weight is a water receptacle of a height that the bottom of the water receptacle projects below the bottom of the water trough.

3. A fountain according to claim 1, wherein said weight includes an extension member attachable between it and the hanger so that the weight projects below the bottom of the water trough.

4. A fountain according to claim 1, wherein said trough is carried at the lower end of a bell-shaped member, said weight being disposed within said member and being of slightly less external dimensions than said member.

* * * * *